(12) United States Patent
Nielsen (10) Patent No.: US 12,193,360 B2
(45) Date of Patent: Jan. 14, 2025

(54) MOWER FOR AN AGRICULTURAL MACHINE

(71) Applicant: Kverneland Group Kerteminde AS, Kerteminde (DK)

(72) Inventor: Rasmus Elmelund Nielsen, Gudjerg (DK)

(73) Assignee: Kverneland Group Kerteminde AS, Kerteminde (DK)

( * ) Notice: Subject to any disclaimer, the term of this patent is extended or adjusted under 35 U.S.C. 154(b) by 730 days.

(21) Appl. No.: 17/427,874

(22) PCT Filed: Jan. 30, 2020

(86) PCT No.: PCT/EP2020/052327
§ 371 (c)(1),
(2) Date: Aug. 2, 2021

(87) PCT Pub. No.: WO2020/161001
PCT Pub. Date: Aug. 13, 2020

(65) Prior Publication Data
US 2022/0117153 A1    Apr. 21, 2022

(30) Foreign Application Priority Data
Feb. 4, 2019  (GB) ...................... 1901480

(51) Int. Cl.
*A01D 34/74*  (2006.01)
*A01B 63/00*  (2006.01)
(Continued)

(52) U.S. Cl.
CPC ............ *A01D 34/54* (2013.01); *A01B 63/002* (2013.01); *A01D 34/006* (2013.01); *A01D 2101/00* (2013.01)

(58) Field of Classification Search
CPC .... A01B 63/002; A01D 34/54; A01D 34/006; A01D 34/8355; A01D 41/127;
(Continued)

(56) References Cited

U.S. PATENT DOCUMENTS 3,906,710 A * 9/1975 Pask ...................... A01D 57/00
    56/DIG. 15
5,794,421 A * 8/1998 Maichle ............... A01D 41/141
    56/DIG. 15
(Continued)

FOREIGN PATENT DOCUMENTS

| CA | 2665589 A1 | 11/2010 |
| CN | 106973617 A | 7/2017 |

(Continued)

OTHER PUBLICATIONS

International Search Report issued in connection with PCT Application No. PCT/EP2020/052327 dated Apr. 9, 2020.
(Continued)

*Primary Examiner* — Thomas B Will
*Assistant Examiner* — Robert E Pezzuto
(74) *Attorney, Agent, or Firm* — Dennemeyer & Associates LLC (57) ABSTRACT

An agricultural machine (10) or, particularly, a mower for an agricultural machine includes a primary frame (13), a mowing unit (14) mounting a cutterbar therein, an adjustable element (17) and a tilt sensor (19). The adjustable element is adjustable in response to a signal from the sensor to re-configure a mowing angle between the cutterbar and/or mowing unit and a ground surface. Such reconfiguration results in adjusting an effective stubble height of the mower. The adjustable element may be positioned between the primary frame (13) and the agricultural machine (10) or between the primary frame (13) and the mowing unit (14).

(Continued)

In the latter case the adjustable element (17) provides independent adjustment of a tilt angle of the mowing unit to a primary actuator (A).

18 Claims, 5 Drawing Sheets

(51) Int. Cl.
    *A01D 34/00* (2006.01)
    *A01D 34/54* (2006.01)
    *A01D 75/30* (2006.01)
    *A01D 101/00* (2006.01)

(58) Field of Classification Search
    CPC .... A01D 41/141; A01D 41/145; A01D 41/16; A01D 41/142; A01D 45/021; A01D 75/287; A01D 2101/00
    See application file for complete search history.

(56) References Cited

U.S. PATENT DOCUMENTS

| | | | | |
|---|---|---|---|---|
| 7,500,341 | B2* | 3/2009 | Hironimus | A01D 75/30 56/6 |
| 2004/0040276 | A1 | 3/2004 | Allworden | |
| 2015/0075067 | A1* | 3/2015 | Stowe | A01D 34/835 47/1.3 |
| 2015/0271999 | A1 | 10/2015 | Enns | |
| 2018/0070531 | A1 | 3/2018 | Long | |
| 2019/0230857 | A1* | 8/2019 | Thomson | A01D 41/141 |
| 2020/0260638 | A1* | 8/2020 | Rotole | A01D 34/07 |

FOREIGN PATENT DOCUMENTS

| | | |
|---|---|---|
| CN | 106068892 B | 9/2018 |
| EP | 0465790 A1 | 1/1992 |
| EP | 3162183 A1 | 5/2017 |
| GB | 2251536 A | 7/1992 |
| GB | 2 557 904 A | 7/2018 |
| JP | H0538222 A | 2/1993 |
| JP | H07213132 A | 8/1995 |

OTHER PUBLICATIONS

Search report for Canadian application No. 3,127,561 mailed on Jul. 10, 2023.

* cited by examiner

MOWER FOR AN AGRICULTURAL MACHINE

CROSS-REFERENCE TO RELATED APPLICATIONS

This is a 35 U.S.C. 371 National Stage Patent Application of International Application No. PCT/EP2020/052327, filed Jan. 30, 2020, which claims priority to United Kingdom application GB 1901480.2, filed Feb. 4, 2019, each of which is hereby incorporated by reference in its entirety.

FIELD OF THE INVENTION

The present invention relates to a mower for an agricultural machine. Particularly, the invention relates to a means for adjusting the stubble height to be cut by a mower in response to a signal from a tilt sensor. In an embodiment the invention relates to an agricultural mowing machine and a mowing unit of an agricultural mowing machine.

BACKGROUND TO THE INVENTION

More generally, embodiments of the invention can relate to various kinds of agricultural machine including, but not limited to, mowing machines, rakes, tedders, seeding machines and soil working machines, including disc harrows and cultivators. Embodiments of the invention relate to a carrier assembly for an operating unit of an agricultural machine, where the operating unit is a mowing unit, a rake, a tedder, a seeding machine or a soil working machine.

A known type of agricultural mowing machine that may be used for harvesting hay, straw and similar crops has a linkage supporting a mowing unit that comprises a plurality of rotary cutter elements attached to a cutterbar. The cutter elements rotate about substantially vertical axes and are provided with cutter blades that cut the crop. The rotary cutters may be of the disc-type, sickle-type or drum-type. Alternative cutterbar configurations are possible such as those having reciprocating toothed blades. The mowing machine may be a conditioning mowing machine that includes a plurality of flails or rollers for conditioning the cut crop, or a plain mowing machine that has no conditioning unit.

The operating unit may be carried by a carrier vehicle, for example a tractor. In the case of an agricultural machine mowing units may be mounted at the front, rear and/or on one or both sides of a tractor or other agricultural carrier vehicle. Usually each side mounted mowing unit is carried by a carrier assembly that includes a carrier arm and is attached to the rear of the tractor.

The carrier assembly may include a pivot mechanism that allows the position of the carrier arm to be adjusted. The carrier arm may for example be located in a cutting position in which the mowing unit is positioned close to the ground to cut the crop, or a transport position in which the mowing unit is lifted behind the cab of the tractor, allowing the tractor to travel along a road. The carrier arm or the mowing unit may also be raised to a headland position in which the mowing unit is lifted a small distance above the cutting position, allowing the tractor to turn when it reaches the headland.

Other types of agricultural machine including rakes, tedders, seeding machines and soil working machines may be mounted in a similar manner with an operating unit (a rake, tedder, seeding machine or soil working machine) mounted on one or both sides of a tractor and carried by a carrier assembly that includes a carrier arm and is attached to the rear of the tractor. Again, the carrier assembly may include a pivot mechanism that allows the position of the carrier arm to be adjusted. The carrier arm may be located in an operating position in which the operating unit is positioned close to the ground or a transport position in which the operating unit is lifted behind the cab of the tractor, allowing the tractor to travel along a road. The carrier arm or the operating unit may also be raised to a headland position in which the operating unit is lifted a small distance above the operating position, allowing the tractor to turn when it reaches the headland.

EP1261247B1 describes a surface adaption device for attachments on harvesting machines where a feeder device height can be adjusted through tilting. The device is concerned with height adjustment of a working tool and not, for example, adjustment of a tilt angle to the ground.

EP2863726B1 describes a coupling device for an agricultural machine, e.g. a mower. The coupling mechanism has connecting rods which comprise a deformable quadrilateral and may allow for tilt adjustment. While adjustment of the cutting angle is possible there is no disclosure regarding how to implement or activate such an adjustment.

SUMMARY OF THE INVENTION

It is an object of the present invention to provide a mower for an agricultural machine and/or a carrier assembly for an agricultural machine that is able to implement a stubble height adjustment through altering a mowing angle or at least provide an alternative stubble height adjustment system compared to known designs.

According to an aspect of the present invention there is provided a mower for an agricultural machine according to the appended claims. Particularly, the invention is concerned with cutterbar adjustment relating to a desired cutting or 'stubble' height of a mowed surface. The mower may be a forage mower, e.g. comprising: a primary frame for mounting to the agricultural machine; a mowing device, e.g. comprised of a mowing bed/unit and/or cutterbar; and at least one adjustable element, preferably as part of a suspension/kinematic system between the primary frame and mowing unit; a sensor located with the suspension/kinematic system and/or associated with the mowing unit; wherein the adjustable element is configured to be adjusted in response to a signal from the sensor, thereby adjusting the mowing angle between the mowing unit and a ground surface independently of an angle between the primary frame and the ground surface.

Preferably the adjustable element is an actuator, e.g. hydraulic link, with adjustable length. In a preferred form a secondary frame extends from the mowing unit as a support for mounting the kinematic system/adjustable element between the primary frame and mowing unit. The kinematic system preferably being a suspension arrangement for enabling the mower unit to ride over uneven ground. In a preferred form the primary frame is mounted from the agricultural machine, such as a tractor, by a primary actuator (e.g. a hydraulic top link) and a connecting arm of fixed-length (e.g. a bottom link). The fixed length connecting arm is connected at a pivot axis proximate a fixing point between the primary frame and mowing unit such that the primary frame can be angularly adjusted by the primary actuator.

The kinematic system preferably includes a biasing element to provide a biasing force between the primary frame and secondary frame or direct to the mowing unit. The biasing force may urge the mowing frame either toward or away from the primary frame against the adjustment of the adjustable element. A biasing element also may provide suspension for the mower such that a substantive weight of the mower is supported enabling a ground contacting skid to move the mower over an uneven ground surface.

A mowing unit is typically fixedly connected via a mainframe with a cutterbar that supports the blades for cutting, however, one form of the invention could involve control of a cutterbar angle independently of the mowing unit. In this way, the principle of the invention is more broadly described as controlling tilt angle, via a sensor, of a ground-proximate mowing/cutting device.

Preferably the sensor is a gyroscope, such as a multi-axis gyroscope. Preferably a controller is configured to process signals from the sensor and provide a display for an operator to prompt adjustments and/or configured to automatically implement adjustments to an effective cutting height of the mower that achieves a desired stubble height. The mower may be part of a front and rear mower system where an operator can select a stubble height which will be implemented across both front and rear mowers, e.g. without having to exit a cabin and manually check stubble heights of the mowers. The system, reliant on combined sensors, may not necessarily provide continuous regulation of mowing angles but enables a desired stubble height level to be set before working. Of course, continuous monitoring and automatic compensation may be possible according to the invention.

The invention enables local monitoring of a cutterbar arrangement such that stubble height can be adjusted according to equipment supplied with the mowing unit, whereas the dimensions and operating characteristics of an agricultural machine (e.g. a tractor) are variable across models and aspects that the supplier of a mowing unit has little control over.

The foregoing aspect of the invention is particularly suited to a front mounted mower unit. In such arrangements the mowing angle can usually be adjusted via a top link from the machine (e.g. a tractor) to the primary frame. The problem with this adjustment is that altering the angle of the primary frame fundamentally changes the kinematic layout of the entire machine and affects other performances (i.e. lifting height and break back protection to avoid obstacles). The present invention enables independent movement of the cutting elements in order to adjust effective stubble height, via a sensing arrangement, without adjusting the primary frame.

The mower, e.g. a forage mower, may broadly comprise: a primary frame for mounting the mower to the agricultural machine; a mowing unit; an adjustable element; and a sensor; wherein the adjustable element is adjustable in response to a signal from the sensor to re-configure a mowing angle between the mowing unit and a ground surface, thereby adjusting an effective stubble height achieved by the mower.

In one form the primary frame is mounted to the agricultural machine by the adjustable element, e.g. a hydraulic (top-link) connecting arm. In this form a second connecting arm located below the adjustable element is preferably of fixed length, connected to the primary frame proximate the mowing unit at a pivot axis. In this way a controller activates an extension or retraction of the adjustable element at a top side of the primary frame while the bottom side pivots and the angle of the mowing unit with the ground is altered. When the sensor indicates a desired angle is reached, via reference signal to the controller, the adjustable element ceases movement and holds at the desired angle. Any variance from the desired angular value can be automatically corrected by the controller (reactivating the adjustable element) in response to a sensor signal.

In one form the mowing unit may be supported by a carrier assembly extending from the primary frame. The carrier assembly may include a carrier arm and a suspension system by which the operating unit is suspended from the carrier arm, e.g. said suspension system including two pairs of connecting rods, comprising a pair of upper connecting rods and a pair of lower connecting rods, each said connecting rod being attached via joints, for example ball joints, to the operating unit and the carrier arm, wherein a first pair of said upper and lower connecting rods diverge in a working direction of the operating unit and a second pair of said upper and lower connecting rods converge in a working direction of the operating unit. This form is best suited to a rear mounted mower unit. The system of the invention may be part of a wider control system that autonomously adjusts the mower to optimal settings for performance and operating cost. Indeed, a preferred form of the system implements at least two mower units, both front and rear, where the stubble height, via tilt angle measurement and adjustment, is synchronised. This results in a consistent mowing function by the total system. Additionally, multiple mowing units also provide extra sensors that can be monitored by the system for comparative purposes. This may be useful when the agricultural machine is situated on an inclined ground surface.

Existing mowing solutions with multiple mowing units arranged around an agricultural machine provide a global system without local monitoring to deduce where the cutterbar is positioned. By contrast, the invention requires provision of a local signal from front and/or rear mowing units for coordination and an equal cutting result. The need for a local signal associated with a cutterbar or equivalent implement tilt angle is not recognised in the prior art.

Further variations on implementation of the invention may include synchronisation of front and rear/side stubble height in the context of trailed mowing equipment.

In accordance with features of the invention the primary frame may be mountable to the agricultural machine by a primary actuator (e.g. a hydraulic top link) and a connecting arm of fixed-length (e.g. a fixed bottom link). In this form the primary actuator is therefore separate to the adjustable element, the adjustable element being located between the primary frame and the mowing unit and/or a second frame extending from the mowing unit to provide independent adjustment of a tilt angle and/or height from the adjustment provided by the primary actuator.

Either aspect may implement a biasing means associated with the adjustable element to provide bias toward a desired mowing angle.

In one preferred embodiment, the agricultural machine is a mowing machine configured with a mowing unit. However, the angle adjustment system described herein could be implemented with machinery functions other than cutting units if appropriate. For example, once aware of the system of the invention analogous technology could be implemented into seeders, tillage equipment, earth moving, construction and road works (e.g. laying asphalt). In such cases the term 'mower' and 'mowing unit' could be substituted for an application-specific equivalent term. A generic form of the invention may be defined as an attachment for a machine comprising: a primary frame for mounting the attachment to the machine; a ground or near-ground contacting device supported by the primary frame; an adjustable element located either between the primary frame and the machine or between the primary frame and ground or near-ground contacting device or both; and at least one sensor for measuring a tilt angle of the ground or near-ground contacting device; wherein the adjustable element is adjustable in response to a signal from the sensor to re-configure the tilt angle between the ground or near-ground contacting device and a ground surface, thereby adjusting an effective height of the ground or near-ground contacting device.

DETAILED DESCRIPTION OF THE INVENTION

Figure 1:
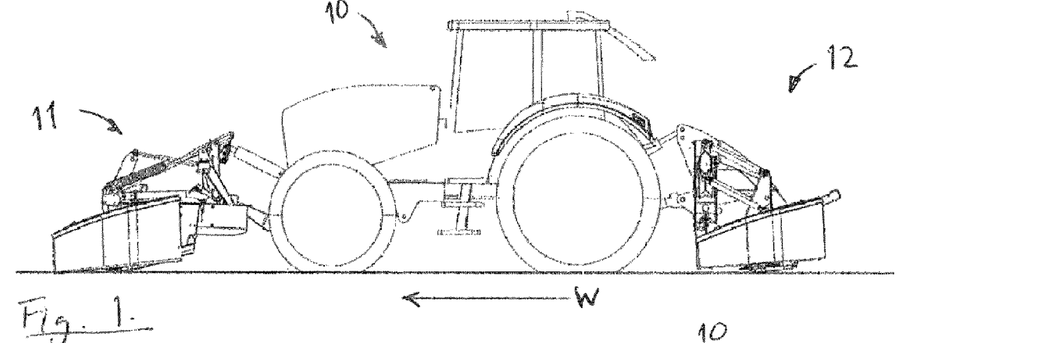
FIG. 1 illustrates a complete side elevation view of a mower according to embodiments of the invention mounted on the front and rear of a tractor, shown in an engaged, ground contacting, position.

FIG. 1 illustrates an overview of a tractor 10 to which is mounted a front mower 11 and a rear mower 12. Typically, the front mower 10 will be of a dimension that extends at least as wide as a maximum width of the tractor 10, while rear mower 12 may be one or a pair of cutting units that each overlap the front mower 11 in the working direction W and extend further outward to provide a wide cutting coverage area. The general arrangement of cutting units on the front, rear and/or side of a tractor are known in the art and will not be described in more detail herein.

Figure 2:
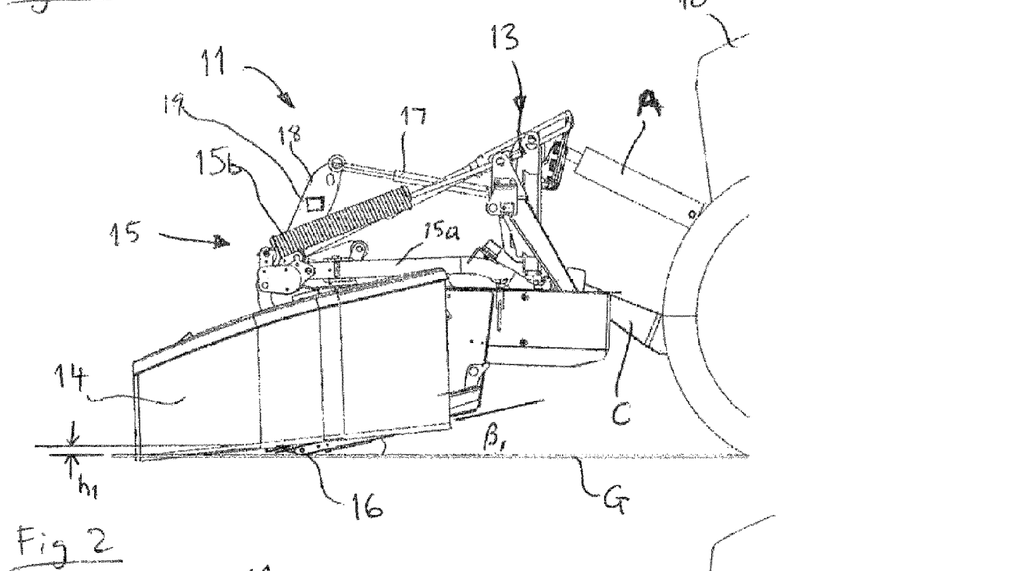
FIG. 2 illustrates a closer side elevation view of a first embodiment of mower, shown in the engaged position from FIG. 1.

FIG. 2 illustrates a more detailed side elevation view of the front mower 11 that is comprised of a primary frame 13 mounted from a top connection arm, being a primary actuator A, and a lower connection arm C from the tractor 10. Primary frame 13 ultimately supports a mowing unit 14 via a kinematic system 15 providing suspension and adjustment of the ground contacting portion of the mowing unit 14. In the known way, mowing unit 14 contacts a ground surface G via skid arrangement 16 and the angle at which mowing unit 14 approaches ground surface G determines a cutting or stubble height $h_1$. A mowing angle $\beta_1$ is defined as the angle between ground surface G and the leading edge of cutting blades proximate skid 16.

Kinematic system 15 features at least one adjustable element 17, a fixed length lower link 15a (making a 'four-bar link') and a spring loaded suspension arm 15b connected between primary frame 13 and the mowing unit 14 and/or a secondary frame 18 that extends as part of the structure of mowing unit 14. As such, extension of the adjustable element 17, which may be a hydraulic or pneumatic actuator, provides an ability to adjust the mowing angle $\beta_1$ independently of the angle between the primary frame 13 and the ground level G (which is adjustable by primary actuator 14 extending directly from the tractor 10).

The capacity to adjust a mowing angle $\beta_1$ or tilt of the cutterbar in order to adjust the effective stubble height (corresponding to mowing height) $h_1$ is enabled by at least one sensor 19 mounted upon second frame 18 and/or upon mowing unit 14. Sensor 19 is configured to provide a reference signal of the tilt of mowing unit 14, to be processed by a suitable controller 29 (see FIG. 8), and indicate an operating stubble height $h_1$. In one form, the sensor is a gyroscope or equivalent sensing means. An alternative may be to implement laser measurement of one or multiple points relative to the ground surface G which can be used to calculate the cutterbar and/or mowing unit tilt and effective stubble height $h_1$.

It will be apparent that the advantage of providing independent adjustment of the mowing angle, via actuator 17, from the adjustment of primary actuator A to primary frame 13 is that it avoids fundamentally changing the kinematic layout of the entire machine which may affect other aspects of performance, i.e. lifting height and break back protection features that may be implemented with the device.

Figure 3:
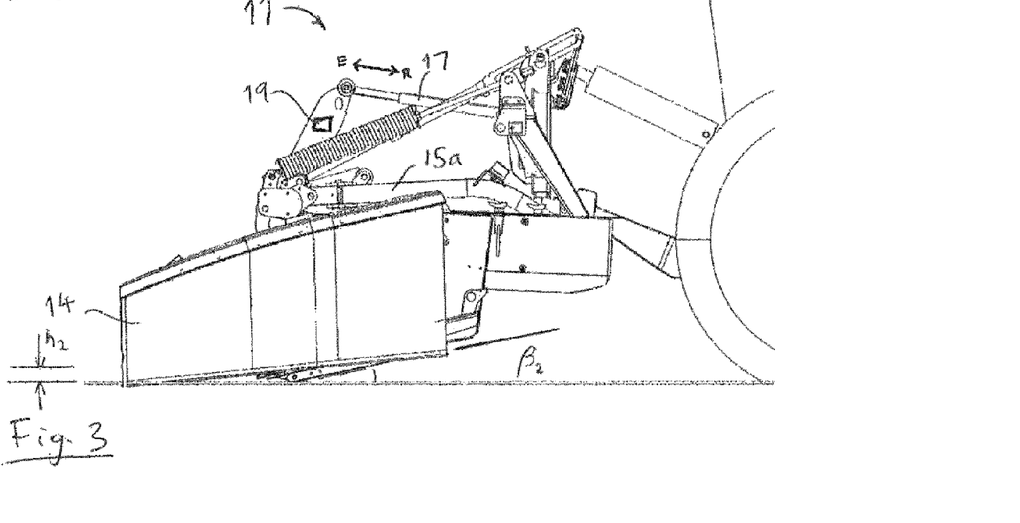
FIG. 3 illustrates a side elevation view of the first embodiment of mower, shown in an engaged position but with the cutting angle adjusted from FIG. 2.

FIG. 3 illustrates the same generally ground engaged position of front mower 11, except that a slight retraction of adjustable element 17 in the direction R raises the leading end of mowing unit 14, resulting in a slight increase in stubble height to a new value $h_2$ while mowing angle is reduced to a new value $\beta_2$. It will be apparent that the fine adjustment of stubble height from $h_1$ to $h_2$ is improved by the separately adjustable element 17, compared to the alternative of effecting change through primary actuator A that must support considerably greater forces. Particularly, adjustment of actuator A will affect how the suspension system 15 reacts to ground undulations.

Stubble height adjustment can be implemented automatically by a controller (see FIG. 8) processing signals from tilt sensor 19 and/or be subject to manual adjustment based on display information ultimately provided by tilt sensor 19.

Figure 4:
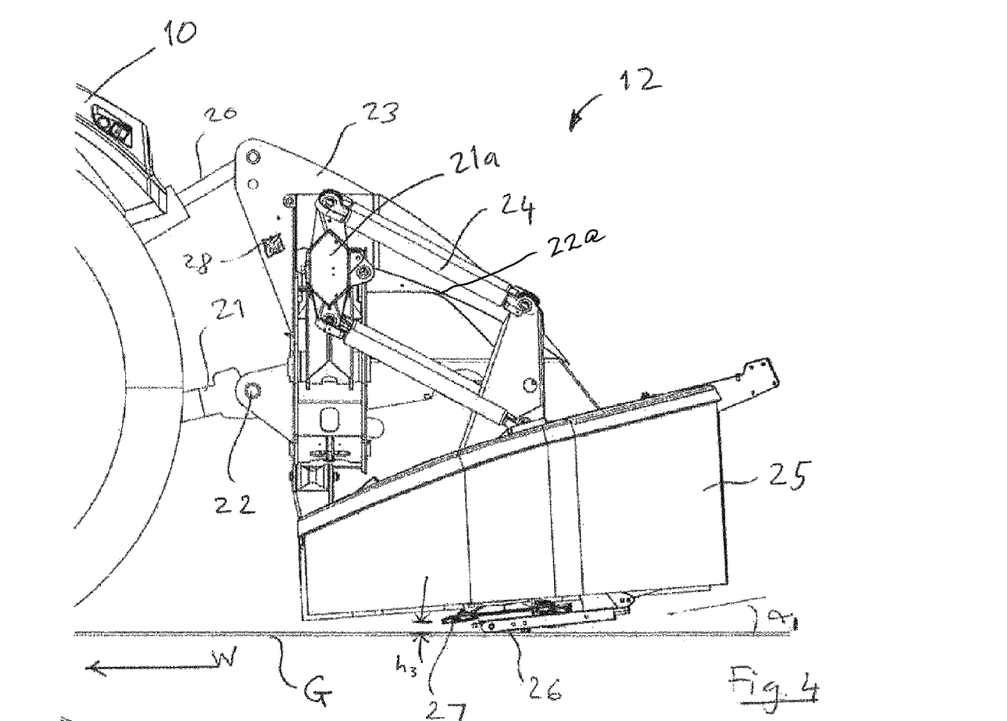
FIG. 4 illustrates a closer side elevation view of a second embodiment of mower, shown in the engaged position from FIG. 1.
Figure 9:
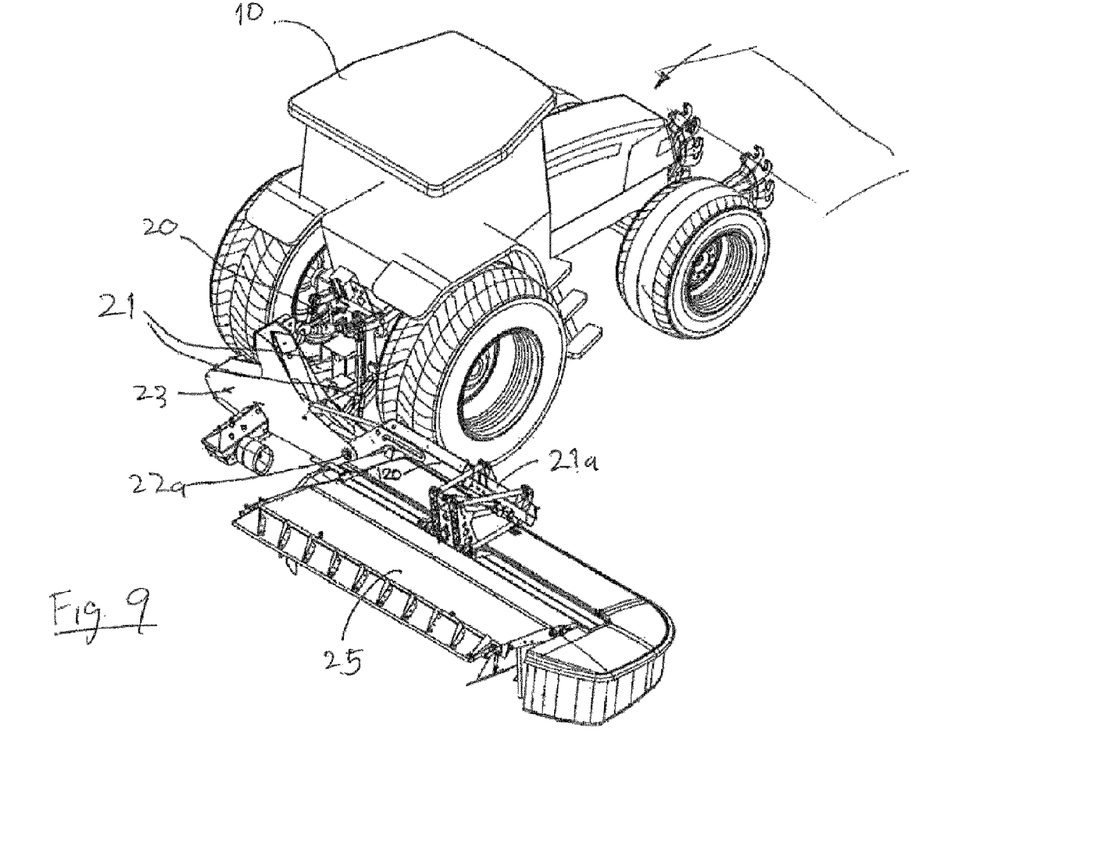
FIG. 9 illustrates a rear perspective view of an agricultural machine including a single side mounted rear mower, e.g. corresponding to that of FIG. 4.

FIG. 4 illustrates a more detailed view of the mower 12 illustrated in FIG. 1. This represents a second embodiment of the invention relating to a rear mower coupled/mounted to tractor 10 by connecting links/arms 20 and 21, e.g. in a 3-point link (as seen in FIG. 9), and a telescopic carrier arm 21a; where connecting arm 20 is a primary actuator extensible to move rear mower 12 about a pivot 22 supported by connecting arm(s) 21 and upon which mower 12 is hitched. Telescopic carrier arm 21a extends laterally from the tractor 10 to support rear mowing unit 25 and is pivotable about a further axis 22a to enable the mowing unit 25 to be raised for transport (e.g. on a public road).

In the context of the rear mower 12, a primary frame 23 provides a mounting platform for a carrier/suspension system 24 associated with carrier arm 21a which ultimately supports the rear mowing unit 25 contacting and/or suspended from ground surface G where a skid 26 and cutting blades 27 of the cutterbar are visible.

In common with the front mower 11, rear mower 12 includes a sensor 28 configured to measure a tilt angle by suitable means, e.g. a gyroscope or equivalent. Use of the signal from sensor 28, fed back to a controller 29 (see FIG. 8), provides an indication of the tilt angle $\alpha_1$ of the rear mower and, hence, effective stubble height $h_3$. Accordingly, adjusting the extension of primary actuator 20 between tractor 10 and primary frame 23 in relation to a reference signal provided by sensor 28 will provide the ability to adjust the mowing angle to a desired angular value, thereby adjusting stubble height. Notably, while adjustment of a mowing angle by a top link from a tractor to a support frame is known, specific automation by use of a tilt sensor and a control circuit (FIG. 8) was not known prior to the present invention being devised. Furthermore, the system of the invention enables cutting of a desired stubble height by front and rear mower units to be synchronised and selected before working without an operator needing to exit the tractor cabin to check settings or by trial and error during operation.

As such, the stubble height adjustment capability of the invention could be part of a larger system that autonomously adjusts the mower to optimal setting for performance or operating cost. The capability of such a system, via sensors, to adjust hitch height or a lift arm of the tractor is also an advantage. For example, the sensors could be used to provide input to a global system. Independent signals associated with control of front and rear units may be utilised by a bigger environment for great control.

Figure 5:
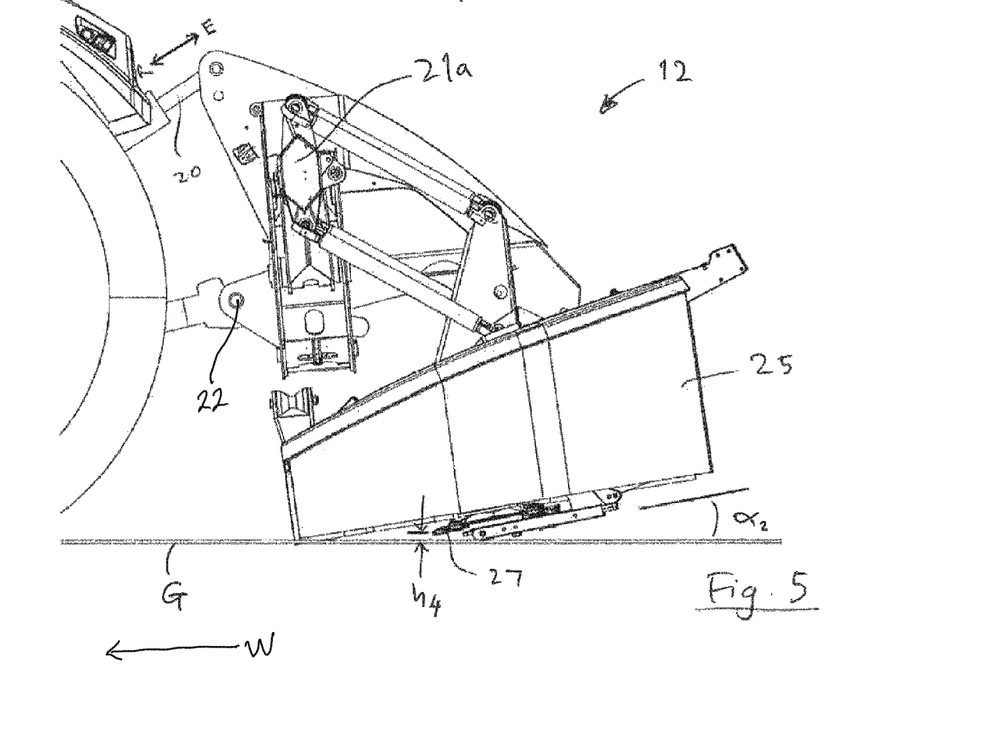
FIG. 5 illustrates a side elevation view of the second embodiment of mower, shown in an engaged position but with the cutting angle adjusted from FIG. 4.

FIG. 5 illustrates a configuration of rear mower 12 where primary actuator 20 has been retracted in the direction of arrow R, resulting in mowing unit 25 tilting about pivot axis 22 (axis 22 being transverse to the working direction W). A leading edge (in relation to the working direction W) of mowing unit 25 moves closer to ground level G, thereby widening the cutting angle to a new value $\alpha_2$ and reducing the stubble height of cutting blades 27 of the cutterbar to a new value $h_4$.

The carrier system 24 provides suspension and support via connecting rods as shown. Optionally the mounting structures, springs and actuator may be supplied separately for retrofitting to an existing mowing unit. Similarly, the carrier assembly comprising the carrier arm and the suspension system may be supplied separately for retrofitting to an existing mowing unit. Indeed the sensor and associated processing capability can be retrofit to existing cutting systems in both rear and front mower configurations.

Figure 6:
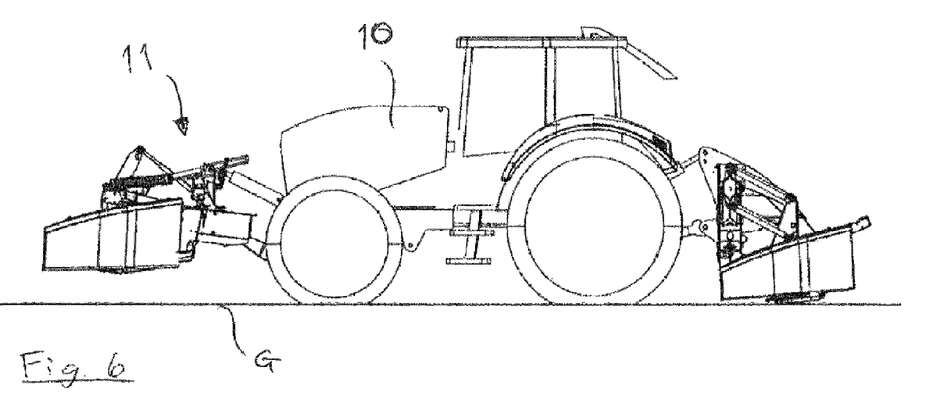
FIG. 6 illustrates a complete side elevation view of the tractor with first mower shown in a raised transport position.
Figure 7:
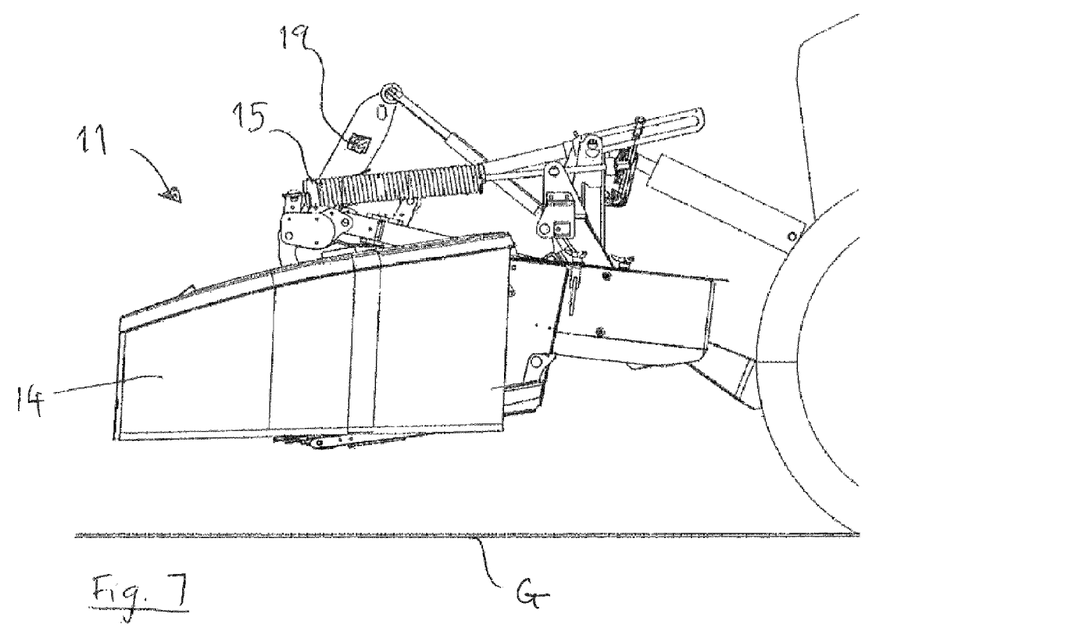
FIG. 7 illustrates a closer side elevation view of the first mower in the raised transport position.

For completeness, FIG. 6 illustrates a view where the front mower 11 has been raised to a transport height, not in contact with ground surface G for a cutting operation. It may also raise to an intermediate, headland, position for temporary disengagement from cutting. FIG. 7 illustrates a more detailed view of the full tractor view of FIG. 6 where the kinematic system 15 is actuated to lift front mower 11 away from ground surface G. Mowing unit 14 moves out of engagement and cutting is no longer possible, although measurements from tilt sensor 19 can still be taken to give a reading of relative tilt of mowing unit 14 to the ground surface G if needed.

Figure 8:
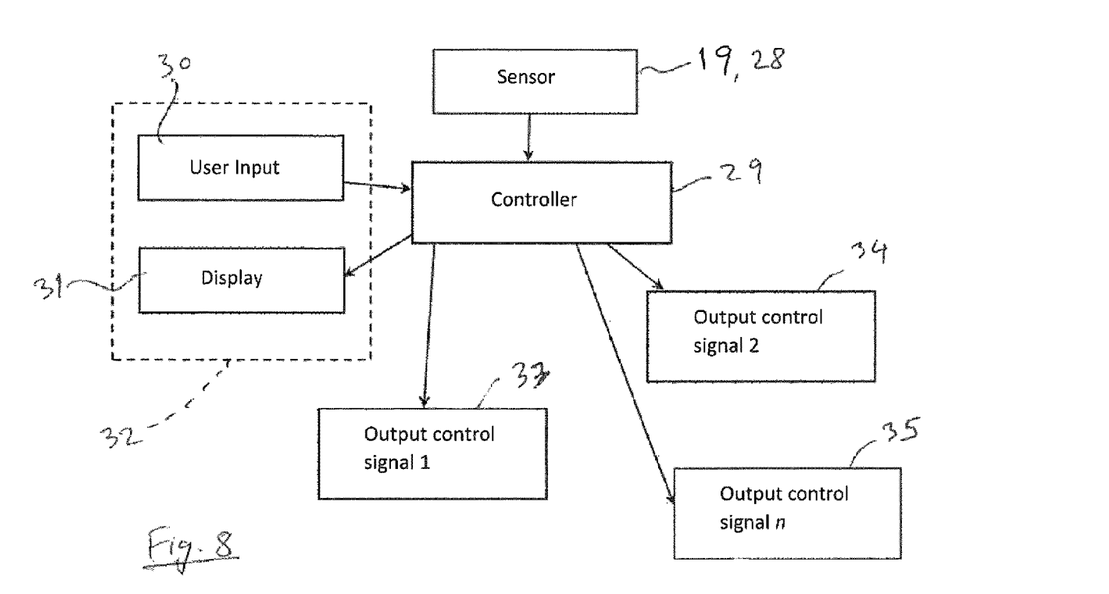
FIG. 8 illustrates a block diagram representing a control circuit for an agricultural machine implementing the invention.

FIG. 8 illustrates a control circuit where sensor 19 or 28 supplies a signal to controller 29 for further processing. User input 30 from an operator/technician located in a tractor cab or elsewhere may be required and have access to a display 31 which shows operational values in numerical, graphic and/or pictographic form. Input 30 and display 31 may be integrated in a touch screen display 32 or equivalent technology.

Once tilt information is suitably processed controller 29 may send one or more control signals to relevant parts of the agricultural machine. A first (33), second (34), up to a possible n (35) number of control signals may be sent for adjusting elements 17 or 20 as needed. As stated previously, stubble height adjustment may be part of a wider autonomous system associated with controller 29 and, particularly, to synchronise effective stubble height across multiple mowing units.

Figure 10:
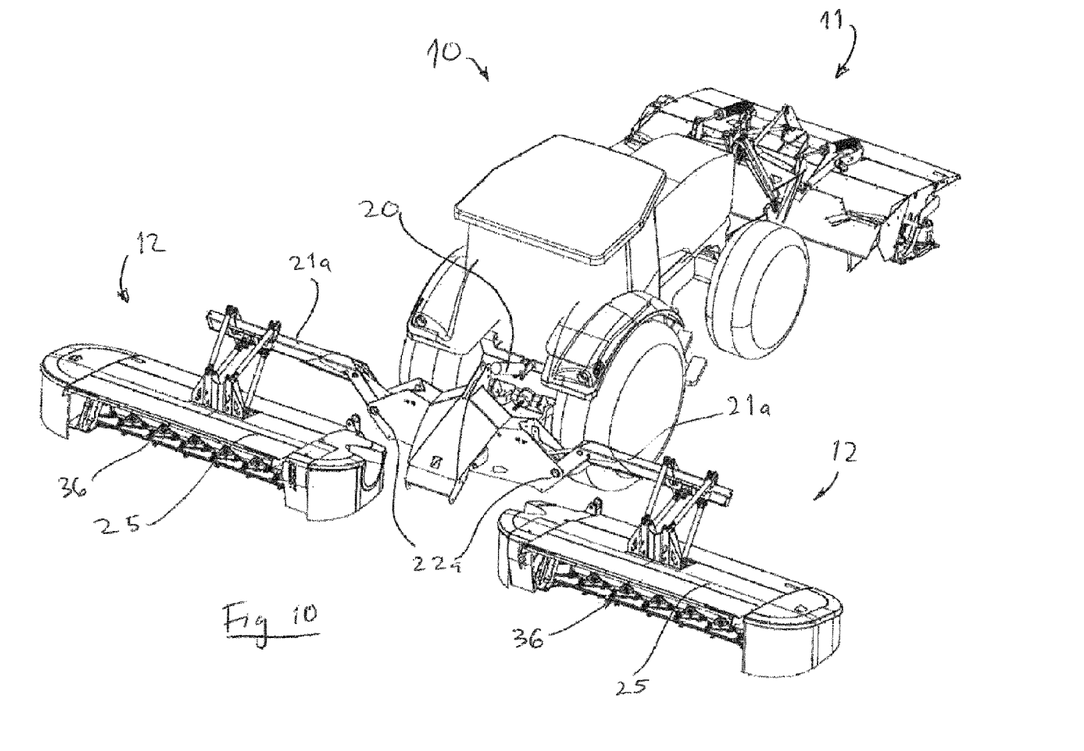
FIG. 10 illustrates a rear perspective view of an agricultural machine including a front mower and double side mounted rear mowers, providing a triple mower total combination.

FIG. 10 shows a rear perspective overview of an agricultural machine 10 fitted with mowers according to the invention. In the illustrated embodiment the agricultural machine is configured with a triple combination of a front mower 11 and two rear mowers 12, hitched from a rear mounting, e.g. primary actuator 20. Particularly, each carrier arm 21*a* extends laterally from the tractor 10 to support a rear mowing unit 25 and is pivotable about a further axis 22*a* to enable the mowing unit 25 to be raised for transport (e.g. on a public road). In this embodiment rear mowing unit 25 has a cutterbar 36 supporting triangular configuration blade system.

The foregoing mower embodiments of FIGS. 1 to 10 have generally been described by reference to a cutterbar in fixed relation to the mowing unit within which it is mounted, because this is a common configuration of such a device. Tilt sensor 19 generates a signal and ultimately adjustable element 17/20 acts to adjust a tilt angle of the whole unit (14, 25) to achieve a desired stubble height. However, an alternative embodiment is shown by FIG. 11 where a cutterbar 36 may be mounted within a mowing unit 14, 25 (not shown) by a connection allowing relative movement, e.g. a pair of pivoting connections through a common axis X.

Figure 11:
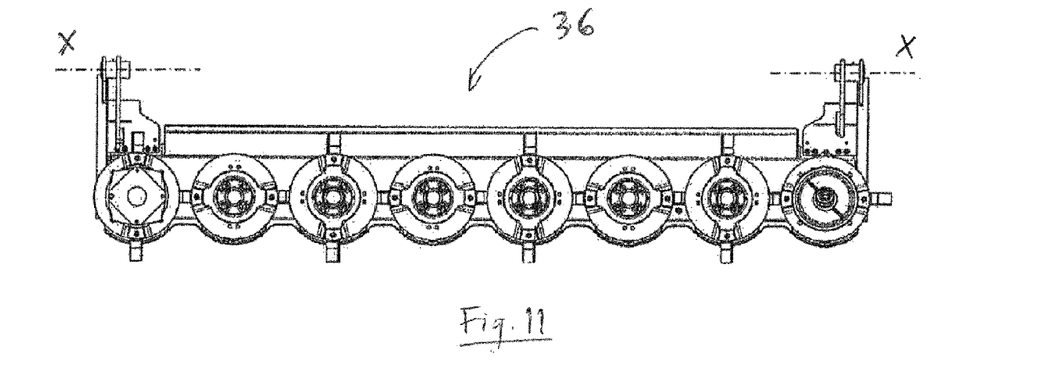
FIG. 11 illustrates a cutterbar incorporating an alternative embodiment of the invention.

According to FIG. 11 an actuator (not shown) may adjust the mounting angle of cutterbar 36 relative to the mowing unit and the ground, as determined by the control system processing signals from tilt sensor 19, 28.

The form of cutterbar 36 of FIG. 11 comprises disc shaped cutting elements as an example but any cutterbar or equivalent cutting element mounting means may benefit from an adjustment according to the invention.

It will be apparent that the tilt adjustable nature of the invention is not necessarily limited to mowing machines but is also applicable to other kinds of agricultural machine including rakes, tedders, seeding machines and soil working machines in which an operating unit is attached to the front and/or rear of a tractor 10 and relative tilt to a ground surface could be adjusted for an effective purpose.

The invention claimed is:

1. A mower for an agricultural machine comprising:
   a primary frame for mounting the mower to the agricultural machine;
   a cutting element;
   an adjustable element;
   wherein the adjustable element is positioned between the primary frame and the cutting element; and
   a sensor;
   wherein the agricultural machine comprises a controller configured to process signals from the sensor;
   wherein the controller is configured to provide a display for an operator to prompt adjustments or automatically implement adjustments to an effective stubble height of the mower; and
   wherein the adjustable element is adjustable in response to a signal from the sensor to re-configure an angle between the cutting element and a ground surface, thereby adjusting an effective stubble height.

2. The mower of claim 1 wherein the sensor is a gyroscope.

3. The mower of claim 1 wherein the adjustable element is a top link actuator configured to reciprocate between an extended and retracted position.

4. The mower of claim 1 wherein the sensor is located with the primary frame.

5. The mower of claim 1 wherein the cutting element is mounted on a cutterbar which, in turn, is mounted from a mowing unit.

6. The mower of claim 5 wherein the sensor is located with the mowing unit or a second frame extending from the mowing unit.

7. The mower of claim 5 wherein the cutterbar or the cutting element is movably mounted from the mowing unit such and the adjustable element is configured to adjust the angle of the cutterbar or the cutting element relative to the mowing unit.

8. The mower of claim 5 wherein the cutterbar or the cutting element is fixedly mounted from the mowing unit such that the adjustable element is configured to adjust the angle of the mowing unit.

9. The mower of claim 1 in combination with a control circuit for receiving input signals from the sensor.

10. An agricultural machine in combination with the mower according to claim 1.

11. The agricultural machine of claim 10 wherein the mower is attached to the agricultural machine by a primary actuator and a connecting arm of fixed-length connected through a pivot axis located on the primary frame, such that the primary frame can be angularly adjusted by the primary actuator.

12. The agricultural machine of claim 10 wherein the mower comprises a front mower and a rear mower system and wherein the system is configured to synchronise an angle of each of the front mower and rear mower to achieve a same effective stubble height of the respective mower.

13. A mower comprising:
a primary frame for mounting to an agricultural machine;
a cutting element;
a mowing unit supporting the cutting element;
at least one adjustable element, located between the primary frame and cutting element or mowing unit; and
at least one sensor associated with the cutting element or mowing unit;
wherein the agricultural machine comprises a controller configured to process signals from the sensor;
wherein the controller is configured to provide a display for an operator to prompt adjustments or automatically implement adjustments to an effective stubble height of the mower; and
wherein the at least one adjustable element is configured to be adjusted in response to a signal indicative of tilt from the at least one sensor, thereby adjusting an angle between the cutting element and a ground surface independently of an angle between the primary frame and the ground surface.

14. The mower of claim 13 wherein the at least one adjustable element provides a first link as part of a suspension system suspending the mowing unit from the primary frame, the suspension system further including a fixed length link that, in combination with the first link, provides a four bar link.

15. The mower of claim 14 wherein the sensor is mounted with the suspension system.

16. A control system for stubble height adjustment of at least one mower, including:
at least one sensor for measuring a tilt angle of the at least one mower;
a processor for processing signals from the at least one sensor;
wherein the processor is configured to receive a signal from the at least one sensor indicating a first angle of tilt of a cutting element of the at least one mower and to calculate a corresponding stubble height of the at least one mower, further configured to send an output signal to an actuator for re-adjustment to a second angle of tilt of the cutting element of the at least one mower, as measured by the at least one sensor, wherein the actuator is positioned between a primary frame and the cutting element.

17. The control system of claim 16 further including a user input means for a user to input a user defined stubble height.

18. The control system of claim 16 wherein there are at least two mowers, corresponding to a front and rear mower for attachment to an agricultural machine, each mower having a respective sensor for measuring a tilt angle.

* * * * *